(12) United States Patent
Watanabe et al.

(10) Patent No.: US 8,249,767 B2
(45) Date of Patent: Aug. 21, 2012

(54) ECO-DRIVE ASSIST APPARATUS AND METHOD

(75) Inventors: Masatoshi Watanabe, Kobe (JP); Masato Ishio, Kobe (JP); Kohichi Tomiyama, Kobe (JP); Tomohiro Matsuo, Kobe (JP); Kan Saito, Okazaki (JP)

(73) Assignee: Fujitsu Ten Limited, Kobe (JP)

( * ) Notice: Subject to any disclaimer, the term of this patent is extended or adjusted under 35 U.S.C. 154(b) by 473 days.

(21) Appl. No.: 12/458,945

(22) Filed: Jul. 28, 2009

(65) Prior Publication Data

US 2010/0030414 A1    Feb. 4, 2010

(30) Foreign Application Priority Data

Jul. 30, 2008  (JP) ................. 2008-197083

(51) Int. Cl.
*G06F 19/00* (2011.01)
(52) U.S. Cl. ......................... 701/22; 340/439
(58) Field of Classification Search .......... 701/22, 701/123, 113; 340/461, 439, 425.5, 425; 180/65.265
See application file for complete search history.

(56) References Cited

U.S. PATENT DOCUMENTS

| | | | | |
|---|---|---|---|---|
| 6,092,021 A * | 7/2000 | Ehlbeck et al. | ............... | 701/123 |
| 6,600,413 B1 * | 7/2003 | Lo | ................. | 340/439 |
| 7,013,205 B1 * | 3/2006 | Hafner et al. | ................... | 701/22 |
| 7,898,405 B2 * | 3/2011 | Burke et al. | ................... | 340/461 |
| 2008/0059035 A1 * | 3/2008 | Siddiqui et al. | ................. | 701/93 |
| 2009/0125173 A1 * | 5/2009 | Komatsu et al. | ................ | 701/22 |

FOREIGN PATENT DOCUMENTS

| | | |
|---|---|---|
| JP | A-2000-205925 | 7/2000 |
| JP | A-2007-112257 | 5/2007 |
| JP | A-2008-114791 | 5/2008 |
| JP | A-2008-254529 | 10/2008 |

* cited by examiner

*Primary Examiner* — Thomas G. Black
*Assistant Examiner* — Marthe Marc-Coleman
(74) *Attorney, Agent, or Firm* — Oliff & Berridge, PLC

(57) ABSTRACT

An eco-drive assist apparatus displays a quantity of eco-drive that indicates a degree of ecology and/or economy in driving in a hybrid vehicle equipped with an engine and a motor. The apparatus includes a first part configured to calculate the quantity of eco-drive on the basis of a vehicle power generated in the vehicle, and a second part configured to cause the quantity of eco-drive to be displayed in a graphic manner as a relative quantity to an eco-drive judgment threshold value that indicates whether the vehicle is in an eco-drive state and as a relative quantity to an engine startup threshold value that indicates whether the engine has been started up and configured to cause the quantity of eco-drive to be displayed on a boundary of the engine startup threshold value or displayed at a position where the quantity of eco-drive is worse than the engine startup threshold value when the engine has been started up. The second part causes the quantity of eco-drive to be displayed at a position where the quantity of eco-drive is better than the engine startup threshold value when the engine has been started up and a driver's operation needs no vehicle power.

6 Claims, 10 Drawing Sheets

ECO-DRIVE ASSIST APPARATUS AND METHOD

FIELD

The present invention relates to an apparatus and a method for assisting the driver in eco-drive.

BACKGROUND

Recently, some vehicles have been equipped with an eco-drive assist apparatus for assisting the driver in eco-drive in view of environmental protection. The eco-drive assist apparatus determines whether the vehicle is traveling efficiently in fuel economy by checking various factors, which may include the degree of depressing the accelerator pedal, the efficiency of the engine and transmission, the traveling speed and the accelerated velocity. When the vehicle is traveling efficiently in fuel economy, the vehicle is in an eco-drive state. When it is determined that the vehicle is in the eco-drive state, an LED (light emitting diode) may be turned ON. The fuel economy may be calculated at an instantaneous time in traveling and may be indicated as an instantaneous fuel efficiency.

Japanese Patent Application Publication No. 2000-205925 proposes displaying a target fuel economy expressed with a mark and an instantaneous fuel economy expressed, with a bar graph on a common index and making it possible for the driver to instantaneously judge whether the instantaneous fuel economy compared with the target fuel economy is good or bad. Japanese Patent Application Publication No. 2007-112257 proposes calculating the time rate of change in the amount of operation of the accelerator pedal every predetermined tune and displaying an eco-drive indicator when the time rate of change is equal to or lower than a threshold value.

In a hybrid vehicle, drive information different from the driver's operation may be displayed when the hybrid vehicle is traveling at a high speed, and may cause the driver to have an uncomfortable feeling. In the hybrid vehicle, the engine is always working when the vehicle is traveling at a high speed. In other words, the engine is working even when the driver releases the accelerator pedal in traveling. Since the engine is working although the driver depresses the accelerator pedal, information indicating that the engine is working is displayed.

SUMMARY OF THE INVENTION

It is an object of the present invention to provide a more reliable or comfortable eco-drive assist apparatus and method capable of realizing more reliable or comfortable eco-drive.

According to an aspect of the present invention, there is provided an eco-drive assist apparatus that displays a quantity of eco-drive that indicates a degree of ecology and/or economy in driving in a hybrid vehicle equipped with an engine and a motor, including: a first part configured to calculate the quantity of eco-drive on the basis of a vehicle power generated in the vehicle; and a second part configured to cause the quantity of eco-drive to be displayed in a graphic manner as a relative quantity to an eco-drive judgment threshold value that indicates whether the vehicle is in an eco-drive state and to cause the quantity of eco-drive to be displayed in a graphic manner as a relative quantity to an engine startup threshold value that indicates whether the engine has been started up and configured to cause the quantity of eco-drive to he displayed on a boundary of the engine startup threshold value or displayed at a position where the quantity of eco-drive is worse than the engine startup threshold value when the engine has been started up, the second part causing the quantity of eco-drive to be displayed at a position where the quantity of eco-drive is better than the engine startup threshold value when the engine has been started up and a driver's operation needs no vehicle power.

According to another aspect of the present invention, there is provided an eco-drive assist apparatus that displays a quantity of eco-drive that indicates a degree of ecology and/or economy in driving in a hybrid vehicle equipped with an engine and a motor, including: a first part configured to calculate the quantity of eco-drive on the basis of a vehicle power generated in the vehicle; and a second part configured to cause the quantity of eco-drive to be displayed, in a graphic manner as a relative quantity to an engine startup threshold value that indicates whether the engine has been started up and configured to cause the quantity of eco-drive to be displayed on a boundary of the engine startup threshold value or displayed at a position where the quantity of eco-drive is worse than the engine startup threshold value when the engine has been started up, the second part causing the quantity of eco-drive to be displayed at a position where the quantity of eco-drive is better than the engine startup threshold value when the engine has been started up and a driver's operation needs no vehicle power.

DETAILED DESCRIPTION

A description will now be given of embodiments with reference to the accompanying drawings.

Figure 1:
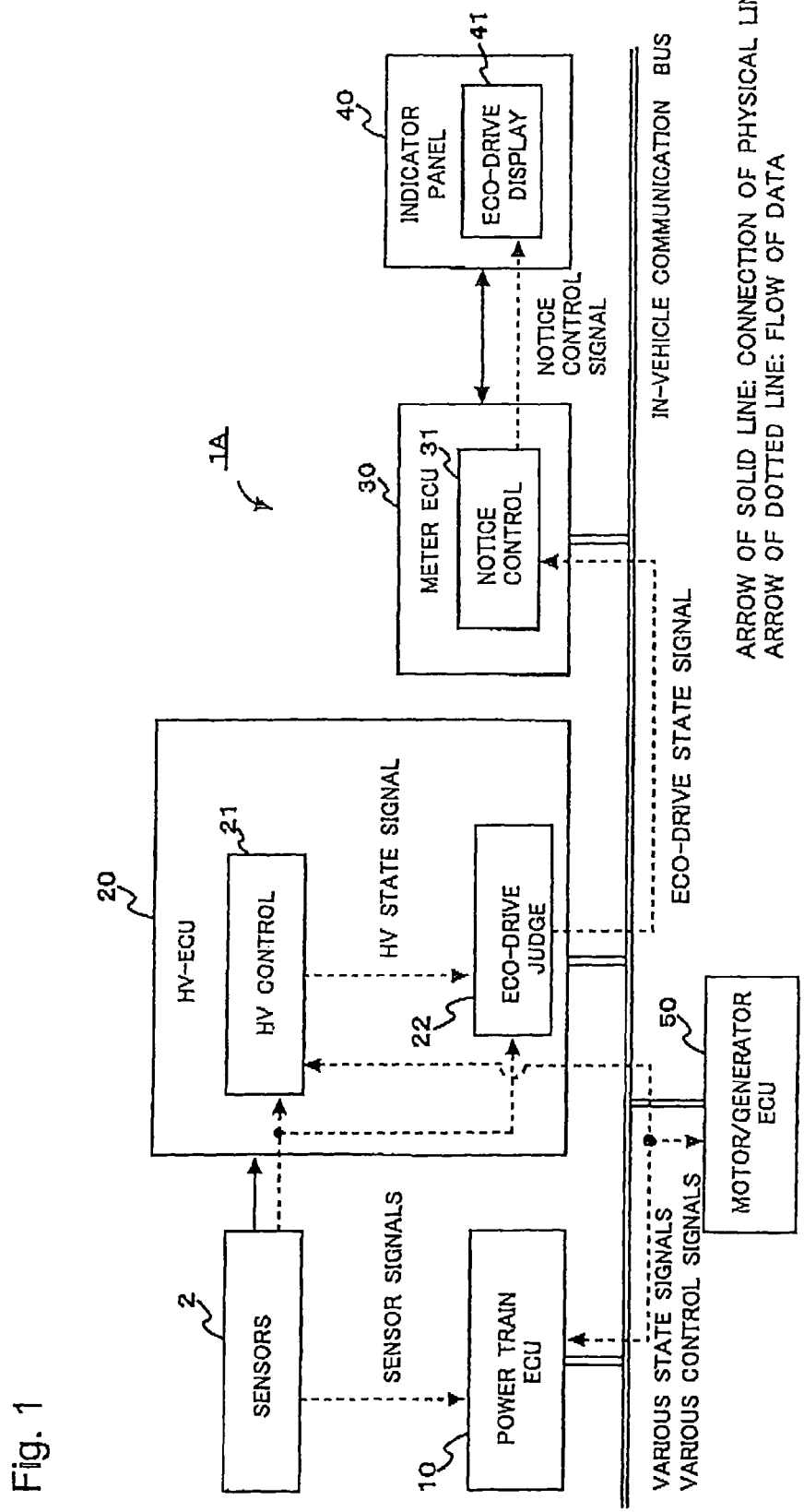
FIG. 1 is a block diagram of an eco-drive assist system or apparatus according to an embodiment.

FIG. 1 is a block diagram of an eco-drive assist system 1A that assists the driver in eco-drive. The term "eco" is defined as a term that includes at least one of economy and ecology. The term "economy" means reduction in consumption of fuel and thus saves fuel, and the term "ecology" means reduction in consumption of fossil fuel and suppression of generation and emission of toxic substance and carbon dioxide, which may be caused when fossil fuel is burned.

The eco-drive assist system 1A includes a power train ECU (electronic control unit) 10, a hybrid ECU (HV-ECU) 20, a meter ECU 30, and a motor/generator ECU 50, all of which ECUs are connected by an in-vehicle communication bus.

The power train ECU 10 controls an engine and a transmission. The hybrid ECU 20 controls a hybrid system. The meter ECU 30 controls display on an indicator panel 40. The motor/generator ECU 50 controls a motor/generator. The hybrid system is a system that drives and controls an engine and a motor so that a hybrid vehicle can travel most efficiently, and is configured to include the hybrid ECU 20, the power train ECU 10, and the motor/generator ECU 50.

In addition to the above-described ECUs, other ECUs may be connected to the in-vehicle communication bus. The solid lines in FIG. 1 show physical connections over which signals may be transmitted, and the broken lines show flows of data.

The power train ECU 10 receives sensor signals from a group of sensors 2 and produces various control commands. The sensor signals may indicate the amount of intake air and the air-fuel ratio. The control commands may be involved in the amount of fuel injection, ignition timing and shift timing, and may be used to drive an injector and an ignition coil.

The hybrid ECU 20 communicates with a battery ECU (not illustrate), an engine ECU (not illustrated), and the motor/generator ECU 50, and controls the overall hybrid system so that the hybrid vehicle can travel most efficiently. In the present embodiment, the hybrid ECU 20 has functions of the eco-drive assist apparatus, and includes a hybrid control part 21 and an eco-drive judgment part 22.

The hybrid control part 21 receives the sensor signals from the sensors 2 and signals from the other ECUs, and produces control signals for controlling the hybrid system. The control signals are applied to the power train ECU 10 and the motor/generator ECU 50. The hybrid control part 21 outputs a hybrid state signal that indicates the state of the hybrid system to the eco-drive judgment part 22. The hybrid state signal may include vehicle power, vehicle output power limit, and power for allowing a battery to be charged.

The eco-drive judgment part 22 receives the hybrid state signal from the hybrid control part 21 and the sensor signals from the sensors 2. The sensor signals applied to the eco-drive judgment part 22 may include a throttle angle measured by a throttle angle sensor (not illustrated), a vehicle speed measured by a vehicle speed sensor, a shift position detected by a shift position sensor (not illustrated), and the state of a switch for switching a vehicle control mode which may include a power mode and a sports mode.

The eco-drive judgment part 22 calculates the quantity of eco-drive on the basis of the hybrid state signal and the sensor signals. The eco-drive judgment part 22 judges, on the basis of the quantity of eco-drive, whether the vehicle is in an eco-drive state or non-eco-drive state. The details of this judgment will be described later. The eco-drive judgment part 22 notifies a notice control part 31 of the meter ECU 30 of the quantity of eco-drive and the results of judging whether the vehicle is in the eco-drive state or non-eco-drive state.

The meter ECU 30 controls the display on the indicator panel 40. In the present embodiment, the meter ECU 30 obtains the eco-drive state signal from the eco-drive judgment part 22, and causes an indication showing the state of the eco-drive created based on the eco-drive state signal to be displayed on an eco-drive display part 41 in real time. The eco-drive display part 41 is provided on the indicator panel 40 and indicates whether the vehicle is in the eco-drive state or not. The eco-drive state part 41 shows the state of the eco-drive on the basis of the notice control part 31 in real time. Exemplary contents of the eco-drive display part 41 will be described later.

The motor/generator ECU 50 controls to drive the motor and generator on the basis of given state signals and control signals from the hybrid ECU 20.

Figure 2:
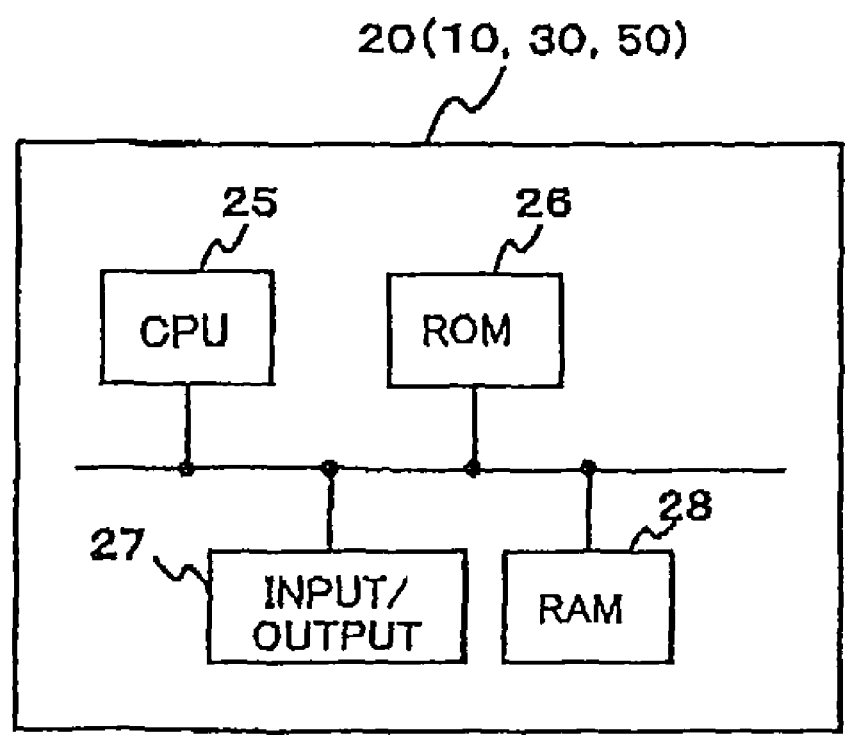
FIG. 2 is a block diagram of an ECU used in the eco-drive assist system illustrated in FIG. 1.

FIG. 2 is a block diagram of an exemplary hardware structure of the hybrid ECU 20, the power train ECU 10, the meter ECU 30, and the motor/generator ECU 50. Each ECU includes a CPU 25, a ROM 26, an input/output part 27, and a RAM 28. The ROM 26 stores programs used to realize controls by the ECUs. Particularly, the ROM 26 of the hybrid ECU 20 stores a program for eco-drive judgment executed by the hybrid ECU 20. The CPU 25 reads the programs in the ROM 26 and executes the programs. The RAM 28 is used as a work area used to temporarily store data processed by the CPU 25. The input/output part 27 is used to input and output data to and from the ECU.

A description will now be given of the quantity of the eco-drive created by the eco-drive judgment part 22. In the present embodiment, the quantity of eco-drive is calculated on the basis of the vehicle power. The hybrid vehicle is equipped with a motor driven by electric power, and an engine. The vehicle power is a single reference that describes energy generated by the motor and energy generated by the engine. The vehicle power may be referred to as electric power, and is the sum of the product of the torque and revolution of the engine and the product of the torque and revolution of the motor.

The eco-drive judgment part 22 obtains the vehicle speed indicated by the sensor signal from the vehicle speed sensor included in the sensors 2 and the vehicle power from the hybrid control part 21. Next, the eco-drive judgment part 22 refers to an eco-drive judgment threshold value map illustrated in FIG. 3, and obtains the upper limit of the vehicle power that makes it possible to determine that the vehicle is in the eco-drive state at the current speed. Hereinafter, the above upper limit may be referred to as an eco-drive judgment threshold value. This map stores the eco-drive judgment threshold value defined as a function of the vehicle speed. The eco-drive judgment threshold value map also stores vehicle power that needs engine start as a function of the vehicle speed. The above vehicle power may be referred to as an engine startup threshold value G.

Figure 3:
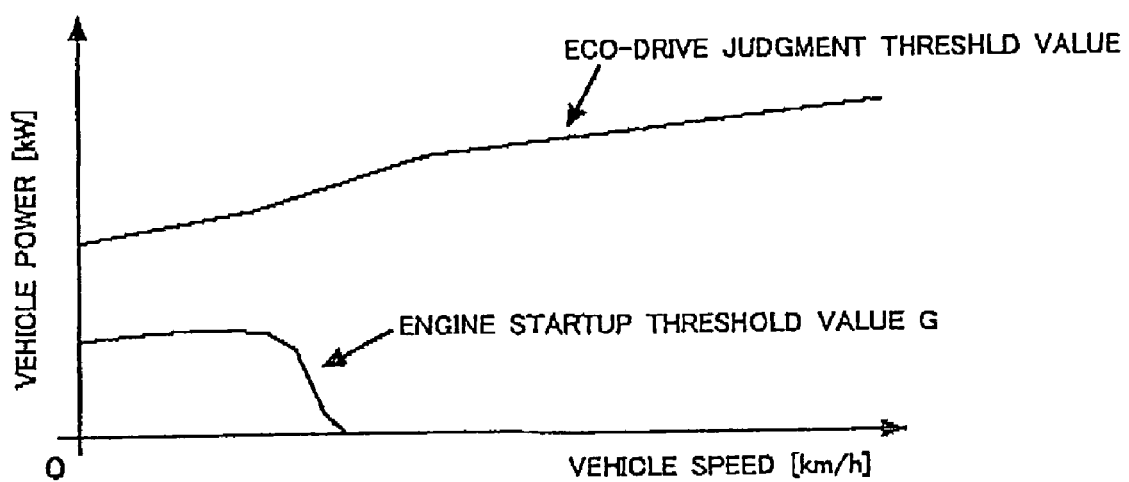
FIG. 3 illustrates a map used to obtain an eco-drive judgment threshold value and an engine startup threshold value from the vehicle speed.

The eco-drive judgment part 22 refers to the eco-drive judgment threshold value map illustrated in FIG. 3, and obtains the eco-drive judgment threshold value of the vehicle power and the engine startup threshold value G. Then, the eco-drive judgment part 22 calculates the quantity of eco-drive using the current vehicle power obtained from the hybrid control part 21 in addition to the eco-drive judgment threshold value and the engine startup threshold value. The details of calculation of the quantity of eco-drive will now be described with reference to FIGS. 4A through 4D.

FIGS. 4A through 4D illustrate examples of an eco-drive bar indicator 60 displayed in the eco-drive display part 41 on the indicator panel 40. The eco-drive bar indicator 60 displayed in the eco-drive display part 41 may be created by the notice control part 31 of the meter ECU 30 on the basis of the eco-drive state signal supplied from the eco-drive judgment part 22. The eco-drive bar indicator 60 illustrates, in a graphic manner, the quantity of eco-drive as a relative quantity to the engine startup threshold value G.

As illustrated in FIGS. 4A through 4D, the eco-drive bar indicator 60 includes a bar indicator 61, a hybrid eco-drive zone 62 (section OA), an eco-drive zone 63 (section AB), a non eco-drive zone 64 (section BC), and a regeneration drive zone 65 (section OD), the engine startup threshold value at position G at position A, and the eco-drive judgment threshold value at position B.

Figure 4A:
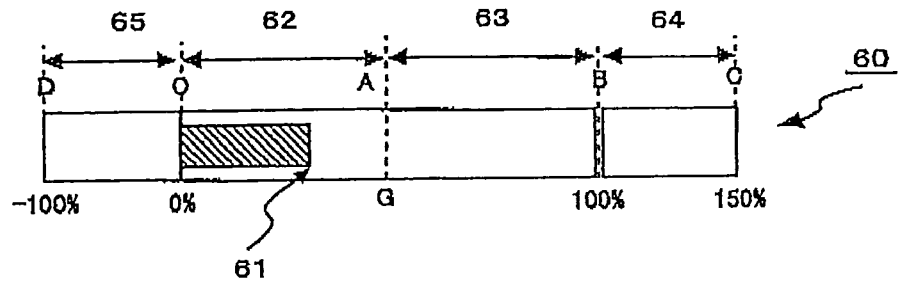
FIGS. 4A through 4D illustrate an eco-drive bar indicator employed in embodiments.

FIG. 4A illustrates an example in which the bar indicator 61 of the quantity of eco-drive is displayed within the hybrid eco-drive zone 62. When the bar indicator 61 of the quantity of eco-drive is displayed within the hybrid eco-drive zone 62, the vehicle is powered by the motor only. In the hybrid eco-drive zone 62, the quantity of eco-drive is displayed by the relative quantity of the current vehicle power generated in the vehicle to the engine startup threshold value G. The quantity of eco-drive in the hybrid eco-drive zone 62 is calculated as follows:

$$[\text{quantity of eco-drive}] = (\text{current vehicle power})/(\text{engine startup threshold value}) \times 50[\%] \quad (1)$$

The upper limit of the hybrid eco-drive zone 62 is the engine startup threshold value G The engine startup threshold value G is used to start up the engine when the vehicle power needed by the driver becomes greater than the engine startup threshold value G.

Figure 4B:
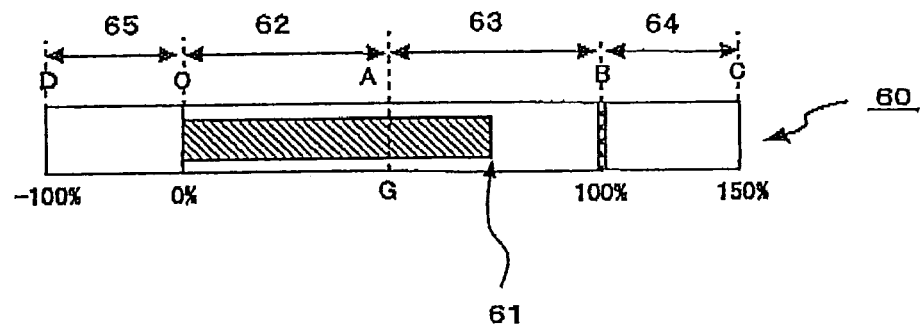

FIG. 4B illustrates an example in which the bar indicator 61 of the quantity of eco-drive is displayed in the eco-drive zone 63. When the vehicle power needed by the driver exceeds the engine startup threshold value G, the quantity of eco-drive is displayed in the eco-drive zone 63. That is, when the engine has been started up, the quantity of eco-drive is displayed so as to be located on the boundary of the engine startup threshold value G or at a position where the degree of eco-drive is worse than that of the engine startup threshold value G.

When the bar indicator of the quantity of eco-drive is displayed within the eco-drive zone 63, the vehicle is powered by both the engine and the motor, and is in the eco-drive state. In the eco-drive zone 63, the quantity of eco-drive is expressed by expression (2) using the current vehicle power, the engine startup threshold value G and the eco-drive judgment threshold value:

$$[\text{quantity of eco-drive}] = [[(\text{current vehicle power}) - (\text{engine startup threshold value})]/[(\text{eco-drive judgment threshold value}) - (\text{engine startup threshold value})]] \times 50[\%] + 50[\%] \quad (2)$$

Figure 4C:
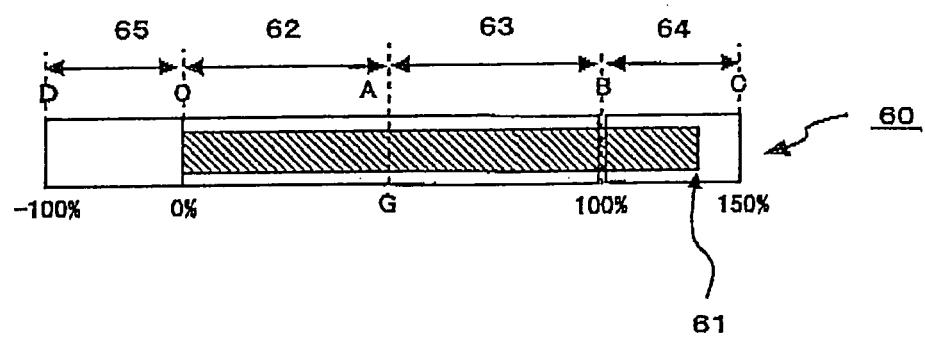

FIG. 4C illustrates an example in which the bar indicator 61 of the quantity of eco-drive is displayed in the non-eco-drive zone 64. When the vehicle power needed by the driver exceeds the eco-drive judgment threshold value, the quantity of eco-drive is displayed in the non-eco-drive zone 64. When the quantity of eco-drive is displayed in the non-eco-drive zone 64, the vehicle is traveling in the non-eco-drive state. The quantity of eco-drive in the non-eco-drive zone 64 may be obtained by using expression (2).

Figure 4D:
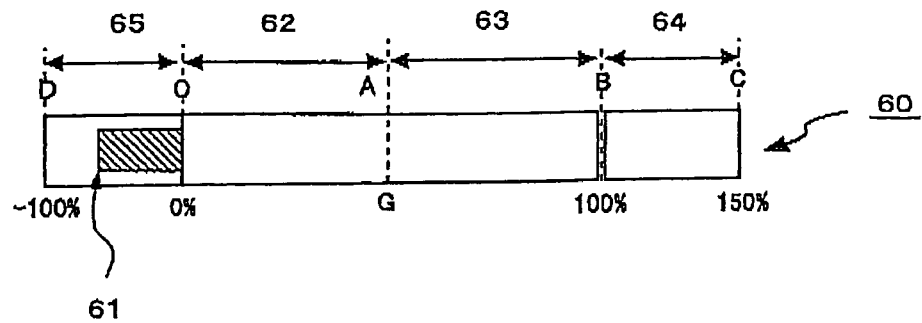

FIG. 4D illustrates an example in which the bar indicator 61 of the quantity of eco-drive is displayed in the regeneration drive zone 65. When the vehicle is in the regeneration drive state due to braking or the like, the bar indicator 61 of the quantity of eco-drive is displayed in the regeneration drive zone 65. In the regeneration drive zone 65, the quantity of eco-drive is obtained by expression (3):

$$[\text{quantity of eco-drive}] = (\text{current vehicle power})/(\text{regeneration limit value}) \times -100[\%] \quad (3)$$

The regeneration limit value may be set to the limit value that can be generated by regeneration or the chargeable limit value.

The position "O" is the original position that is at the boundary between the eco-drive zone 63 and the regeneration drive zone 65. When the quantity of eco-drive is displayed on the position "O", the quantity of eco-drive is 100%.

The engine startup threshold value G varies on the basis of the vehicle speed and the battery remaining capacity and is 0 [kW] at minimum. That is, when the engine startup threshold value G is 0 [kW], the vehicle is located at position "O" or "A".

Figure 5:
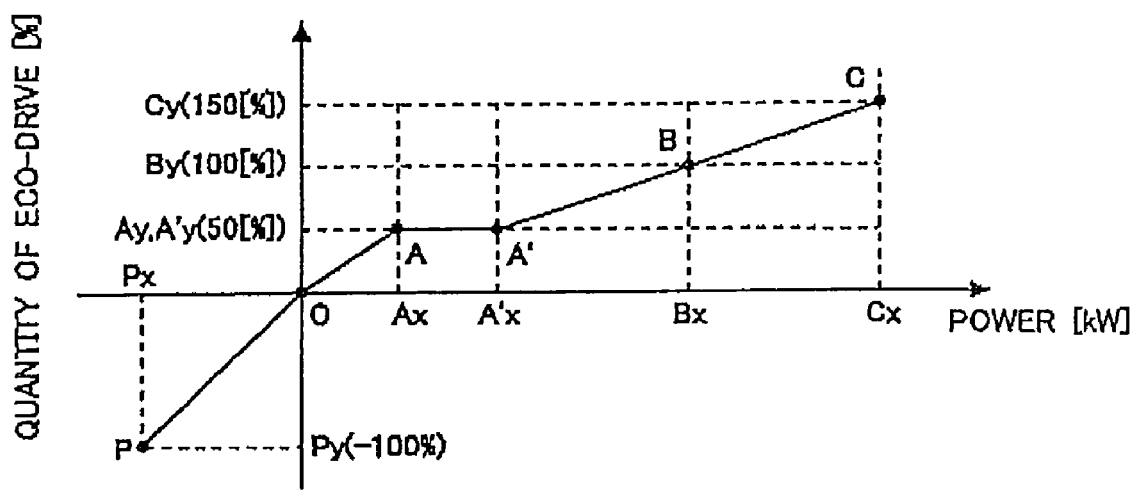
FIG. 5 illustrates a map used to calculate the quantity of eco-drive.

The quantity of eco-drive may be obtained using a map illustrated in FIG. 5. The use of the map makes it possible to simplify the calculation of the quantity of eco-drive. The horizontal axis of the map illustrated in FIG. 5 denotes the vehicle power [kW], and the vertical axis denotes the quantity of eco-drive [%]. A point "A'" in the map is the engine start threshold value. A point "A" indicates a display change threshold value used to change the bar indicator 61 from the hybrid eco-drive zone 62 to the eco-drive zone 63. The quantity of eco-drive is 50 [%] at point "A" and point "A'".

A point "B" in the map is the eco-drive judgment threshold value. The quantity of eco-drive at point "B" is 100 [%]. The quantity of eco-drive at point "C" is 150 [%], and a point "P" denotes the regeneration limit value at which the quantity of eco-drive is −100 [%]. The following is assumed: $Px < Ox \leq Ax \leq A'x \leq Bx < Cx$ where Px, Ox, Ax, A'x, Bx and Cx are respectively X coordinate values of points "P", "O", "Ax", "A'x", "Bx" and "Cx".

When the engine startup threshold value is 0 [kW], the engine is always working. In this case, even when the accelerator pedal is OFF (when the vehicle power needed by the driver is 0 [kW]), the quantity of eco-drive is displayed within the eco-drive zone 63. Since the engine has been started up, the quantity of eco-drive goes beyond the hybrid eco-drive zone 62 and is displayed in the eco-drive zone 63. At this time, since the degree of depressing the accelerator pedal is zero [%], the quantity of eco-drive is displayed in the eco-drive zone 63, and there is a mismatch between the driver's operation on the accelerator pedal and the eco-drive bar indicator 60.

With the above in mind, according to the present embodiment, when the driver's operation does not need any vehicle power after the engine has been started up, the eco-drive judgment part 22 controls the display so that the quantity of eco-drive is located at a position where the degree of eco-drive is better than that of the engine startup threshold value G. In addition to the above, similar display control may be carried out when the engine has been started up in a state in which the driver's operation does not need any vehicle power at all or the driver's operation on the accelerator pedal is idle. The display so that the quantity of eco-drive is located at a position where the degree of eco-drive is better than that of the engine startup threshold value G, includes such a display that the greatest degree of eco-drive can be obtained except the case where the quantity of eco-drive is in the regeneration drive zone 65.

Figure 6A:
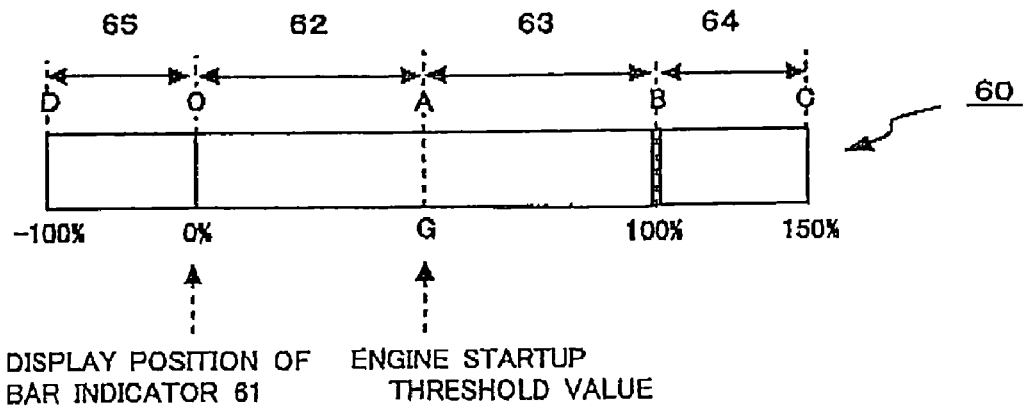
FIGS. 6A through 6C illustrate another example of the eco-drive bar indicator.

More particularly, when the engine startup threshold value is 0 [kW] and the vehicle power needed by the driver is 0 [kW], the quantity of eco-drive is displayed with 0 [%] although the engine has been started up. That is, as illustrated in FIG. 6A, the bar indicator 61 that shows the quantity of eco-drive is displayed on the original point "O" (that is, 0%). It is thus possible to remove the mismatch between the driver's operation on the accelerator pedal and the eco-drive bar indicator 60.

Figure 6B:
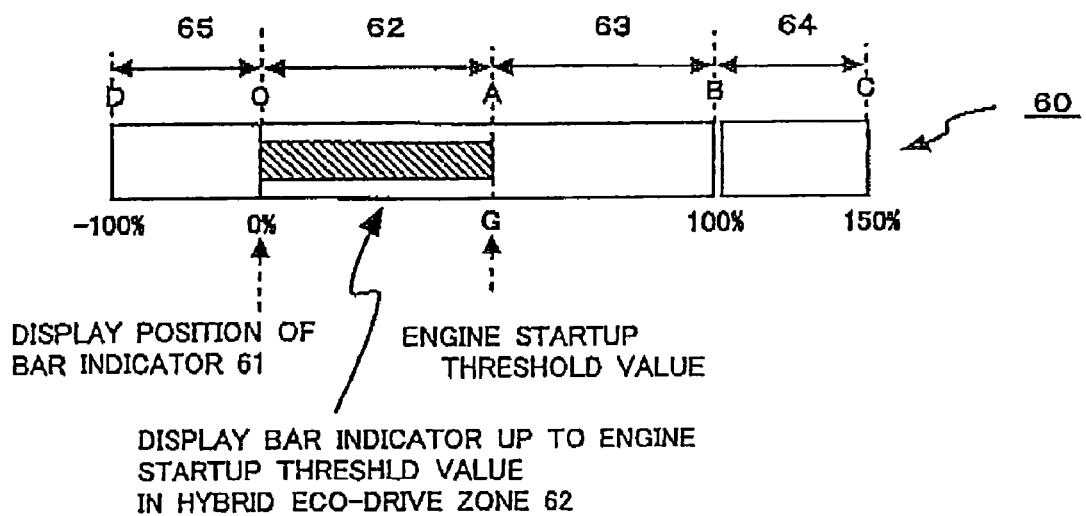
Figure 6C:
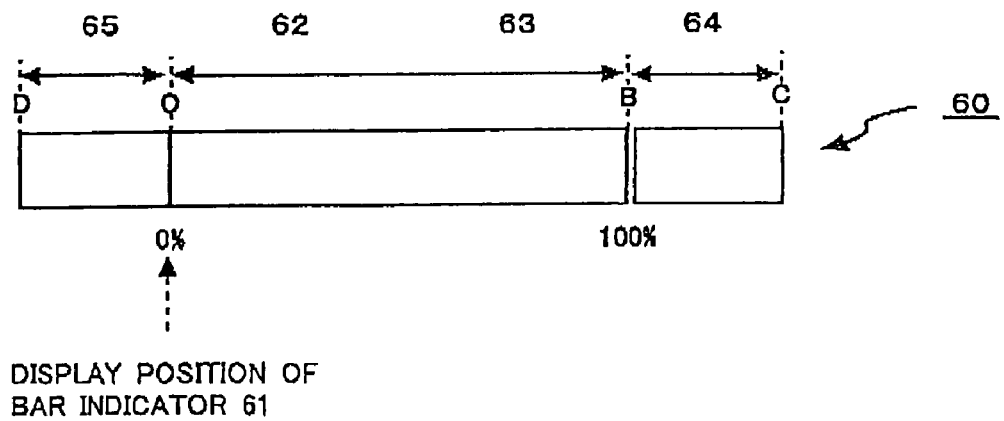
Figure 7:
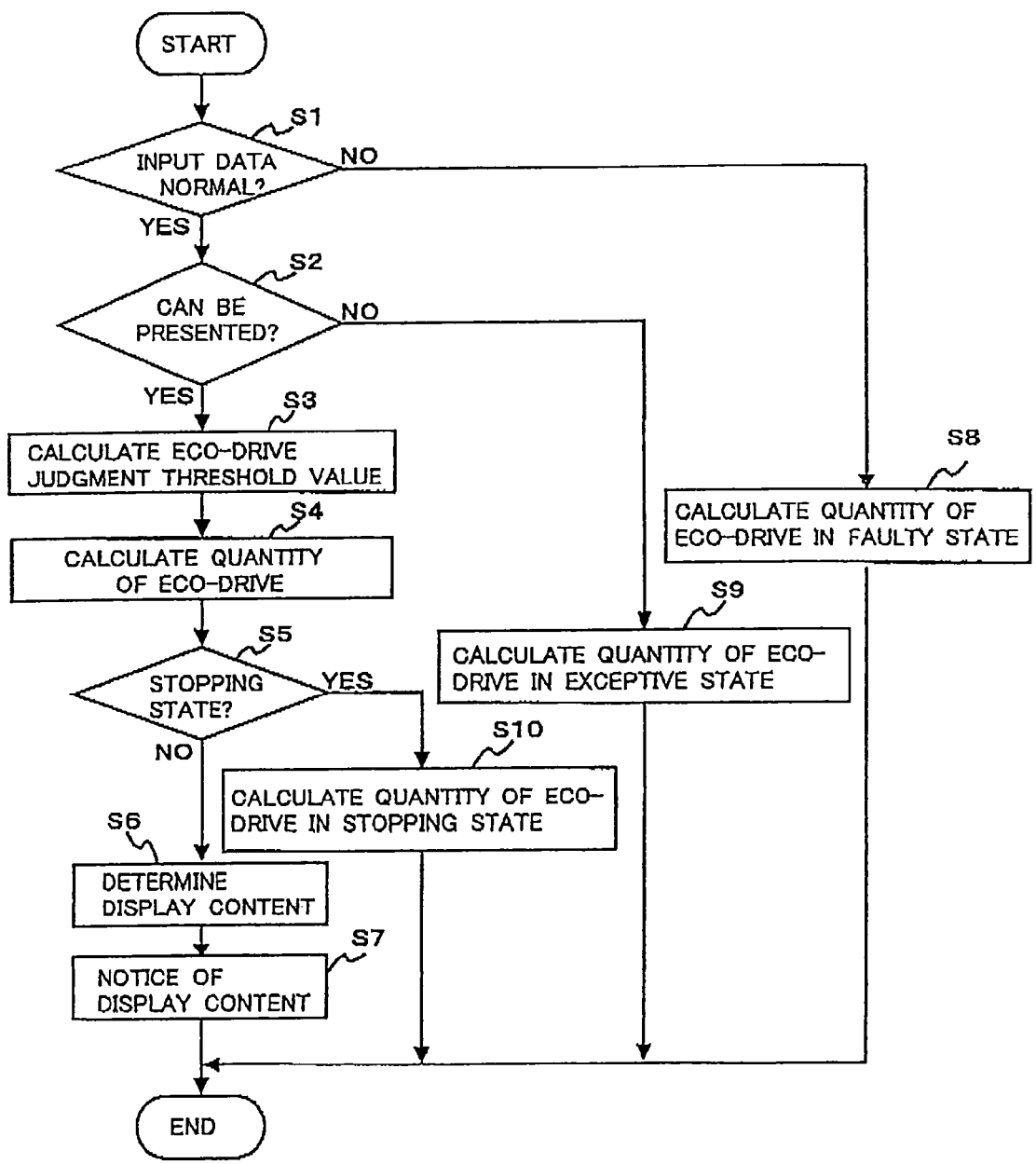
FIG. 7 is a flowchart of a process flow of an eco-drive judgment part illustrated in FIG. 1.

It is possible to display the bar indicator 61 in the eco-drive zone 63 and that in the hybrid eco-drive zone 62 in different manners. More particularly, as illustrated in FIG. 6B, when the engine startup threshold value G is 0 [kW] (that is, the engine has been started up) and the vehicle power needed by the driver is 0 [kW], the bar indicator 61 is displayed so as to extend up to the engine startup threshold value G in the hybrid eco-drive zone 62 and is displayed with 0 [%] in the eco-drive zone 63. It is possible to indicate that the engine has been started up by displaying the bar indicator 61 only in the hybrid eco-drive zone 62. Further, as illustrated in FIG. 6C, the bar indicator 61 may be displayed with 0 [%], while the hybrid eco-drive zone 62 is not illustrated.

A description will now be given of a process flow of the eco-drive judgment part 22 for displaying the eco-drive bar indicator 60 in the eco-drive display part 41 of the indicator panel 40.

The eco-drive judgment part 22 receives measured data sensor from the sensors 2 and determines whether the received measured data are normal at step S1. The eco-drive judgment part 22 determines whether the sensors 2 operate normal by checking the measured data. For example, if identical data is continuously input over a predetermined time, the corresponding sensor is determined to be faulty. When it is determined that the input data is abnormal (NO at step S1), the eco-drive judgment part 22 determines the quantity of eco-drive in the faulty state to 0 [%] at step S8.

When it is determined that the measured data is normal (YES at step S1), the eco-drive judgment part 22 determines whether the current vehicle condition allows the eco-drive indicator (eco-drive bar indicator 60) to be presented to the user at step S2. The answer of step S2 is NO when the shift lever is at the parking position or a signal showing that a power switch is turned ON is input. When the answer of step S2 is NO, the eco-drive judgment part 22 sets the quantity of eco-drive in the exceptive state to 0 [%] at step S9.

The eco-drive judgment part 22 obtains the eco-drive judgment threshold value by referring to the eco-drive judgment threshold map illustrated in FIG. 3 at step S3. In the present embodiment, the eco-drive judgment threshold value is calculated from the vehicle speed from the corresponding sensor 2. The eco-drive judgment part 22 stores the map illustrated in FIG. 3 in a memory, and obtains the eco-drive judgment threshold value. The map illustrated in FIG. 3 may be created by an experiment.

The eco-drive judgment part 22 calculates the quantity of eco-drive from the eco-drive judgment threshold value obtained at step S3 and the current vehicle power obtained from the measured data from the sensors 2 at step S4. The quantity of eco-drive may be obtained from the aforementioned expressions (1) through (3).

The eco-drive judgment part 22 determines whether the vehicle is in the stopping state at step S5 by referring to the vehicle speed. For example, when the vehicle speed is less than 2 km/h, it is determined that the vehicle is in the stopping state. When the vehicle speed is greater than 4 km/h, it is determined that the vehicle is in the traveling state. When the vehicle speed is equal to or greater than 2 km/h and is equal to or less than 4 km/h, the eco-drive judgment part 22 does not make a decision but waits for a change in speed. When it is determined that the vehicle is in the stopping state (YES at step S5), the eco-drive judgment part 22 sets the quantity of eco-drive to 0 [%] at step S10.

The eco-drive judgment part 22 determines how the bar indicator 61 should be displayed in the eco-drive bar indicator 60 by referring to the quantity of eco-drive calculated at step S4. This process will be described in detail later with reference to a flowchart of FIG. 8. After determining the way to display the bar indicator 61, the eco-drive judgment part 22 notifies the meter ECU 30 of an eco-drive state signal that includes information about the quantity of eco-drive and the way to display the bar indicator 61. The meter ECU 30 causes the eco-drive bar indicator 60 including the bar indicator 61 to be displayed in the eco-drive display part 41 in accordance with the eco-drive state signal supplied from the eco-drive judgment part 22.

Figure 8:
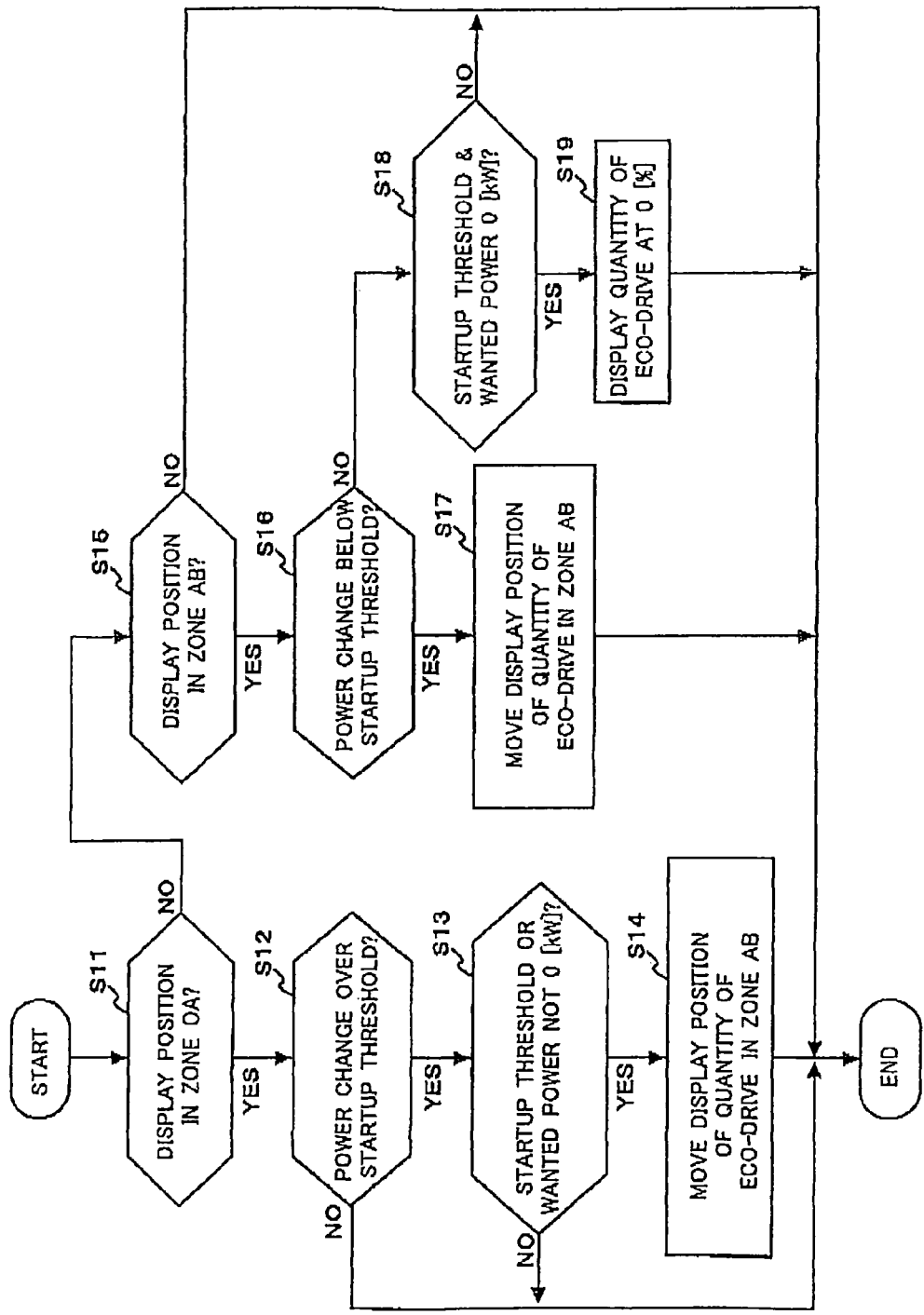
FIG. 8 is a flowchart of a process flow of determining a manner to display the eco-drive bar indicator.

A description will now be given, with reference to FIG. 8 of a process flow of the eco-drive judgment part 22 executed when the engine startup threshold value is 0 [kW] and the vehicle power needed by the driver is 0 [kW].

First of all, at step S11, the eco-drive judgment part 22 determines whether the current position of display of the quantity of eco-drive is within the zone OA that is the hybrid eco-drive zone 63. That is, the eco-drive judgment part 22 determines whether the vehicle power needed by the driver is less than the engine startup threshold value G. When it is determined that the current position of display of the quantity of eco-drive is within the zone OA of the eco-drive zone 63 (YES at step S11), the eco-drive judgment part 22 acquires information about the vehicle power from the hybrid control part 21, and determines whether the vehicle power needed by the driver is changed to a level equal to or greater than the engine startup threshold value G at step S12. When the vehicle power needed by the driver is not equal to or greater than the engine startup threshold value G (NO at step S12), the eco-drive judgment part 22 ends the process.

When the vehicle power needed by the driver is changed to a level greater than the engine startup threshold value G (YES at step S12), the eco-drive judgment part 22 determines whether the engine startup threshold value G is 0 [kW] and determines whether the vehicle power needed by the driver is 0 [kW] at step S13. When the engine startup threshold value is not 0 [kW] or the vehicle power needed by the driver is not 0 [kW], the eco-drive judgment part 22 judges that the vehicle power needed by the driver exceeds the engine startup threshold value G, and causes the quantity of eco-drive to be displayed in the zone AB of the eco-drive zone 63 that goes beyond the engine startup threshold value G at step S14. When it is determined at step S13 that the engine startup threshold value G is 0 [kW] or the vehicle power needed by the driver is 0 [kW]> the eco-drive judgment part 22 ends the process.

When it is determined at step S11 that the current position of display of the quantity of eco-drive is not within the zone OA of the hybrid eco-drive zone 62 (NO at step S11), the eco-drive judgment part 22 determines whether the quantity of eco-drive is within the zone AB of the eco-drive zone 63 at step S15. When the quantity of eco-drive is not within the zone AB of the eco-drive zone 63 (NO at step S15), the eco-drive judgment part 22 ends the process. In contrast, when the quantity of eco-drive falls within the zone AB of the eco-drive zone 63 (YES at step S15), the eco-drive judgment part 22 acquires the vehicle power from the hybrid control part 21, and compares the vehicle power needed by the driver with the engine startup threshold value G at step S16.

When the vehicle power needed by the driver is changed to a level less than the engine startup threshold value G (YES at step S16), the eco-drive judgment part 22 moves the current position of display of the quantity of eco-drive to a position in the zone OA of the hybrid eco-drive zone 62 at step S17. When the vehicle power needed by the driver is equal to or greater than the engine startup threshold value G (NO at step S16), the eco-drive judgment part 22 determines whether the engine startup threshold value G is 0 [kW] and the vehicle power needed by the driver is 0 [kW] at step S18. When it is determined at step S18 that the engine startup threshold value G is 0 [kW] and the vehicle power needed by the driver is 0 [kW] (YES at step S18), the eco-drive judgment part 22 causes the quantity of eco-drive to be displayed at 0 [%]. That is, the bar indicator 61 is displayed on the origin "O" in the eco-drive bar indicator 60 illustrated in FIG. 4.

As described above, when the engine startup threshold value is 0 [kW] and the vehicle power needed by the driver is 0 [kW], the quantity of eco-drive is displayed at 0 [%]. That is, the engine is working but the quantity of eco-drive is 0 [%]. It is thus possible to match the drive's operation on the accelerator pedal and the eco-drive bar indicator 60.

Figure 9:
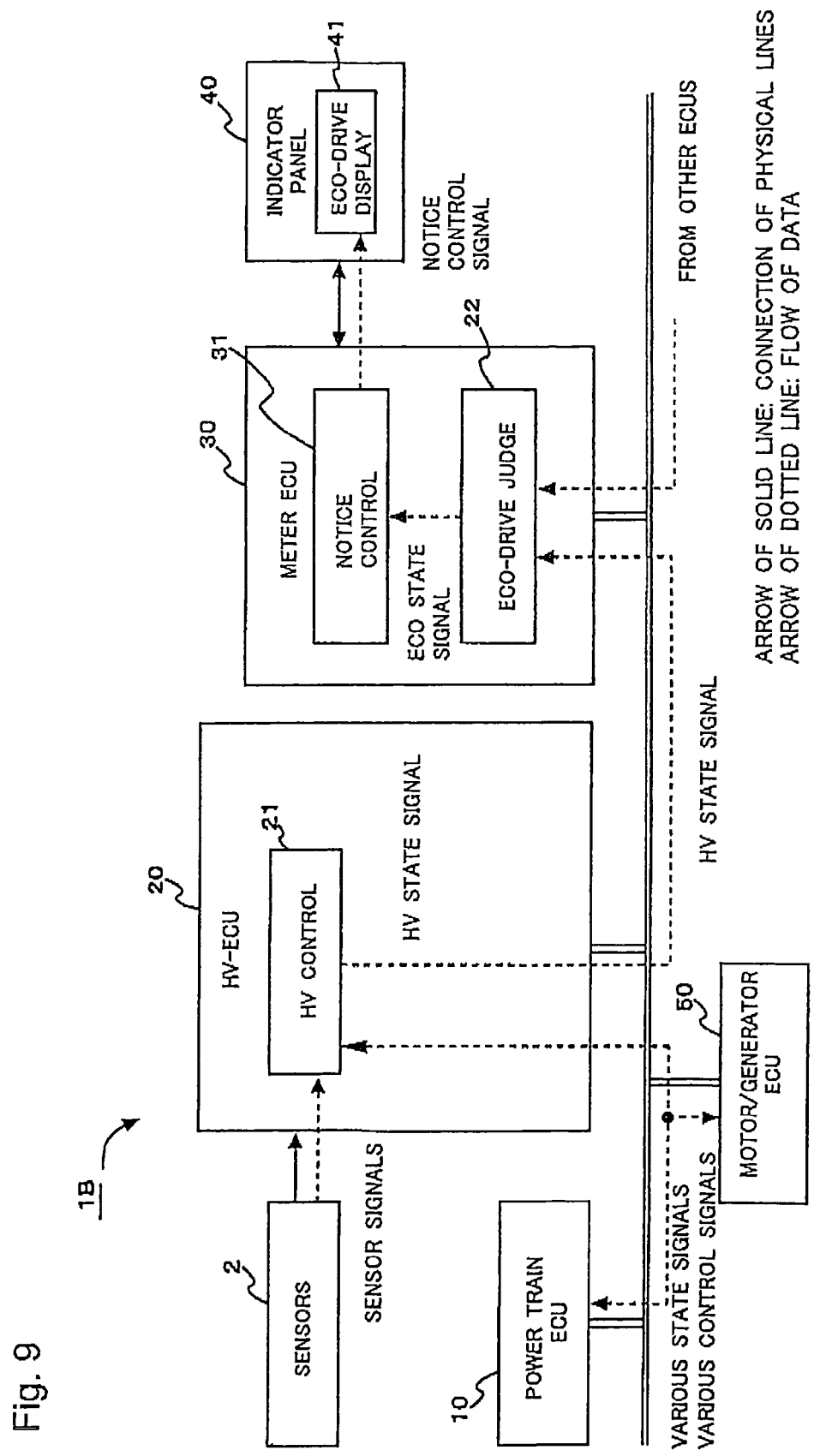
FIG. 9 is a block diagram of a variation of the eco-drive assist system or apparatus in which the eco-drive judgment part is provided in a meter ECU.

The above-described embodiment may be varied within the scope of the present invention. For example, the above configuration in which the eco-drive judgment part 22 is provided in the hybrid ECU 20 may be varied as illustrated in FIG. 9 in which there is illustrated an eco-drive assist system 1B equipped with the eco-drive judgment part 22 provided in the meter ECU 30. Yet another variation may be made in which the eco-drive judgment part 22 is provided in a navigation ECU connected to the in-vehicle communication bus.

Figure 10A:
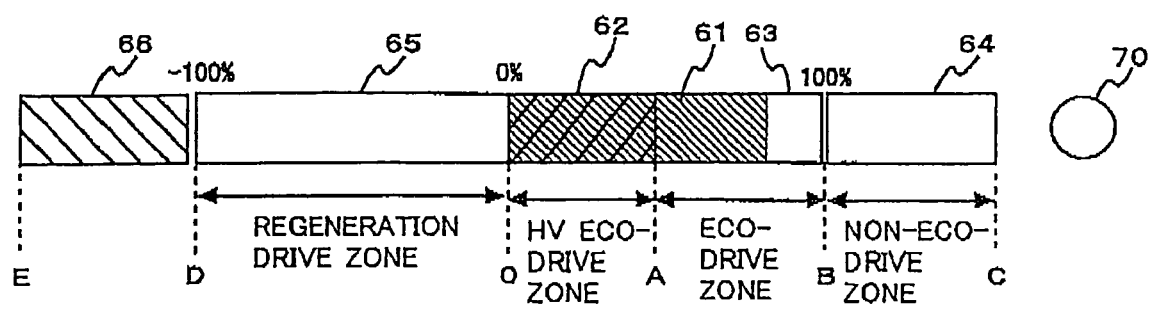
FIGS. 10A and 10B illustrate other examples of the eco-drive bar indicator.

The eco-drive bar indicator 60 illustrated in FIG. 4 in which only the regeneration drive-zone 65 is provided as the display zone on the regeneration side may be varied as shown in FIG. 10A in which a non-eco-drive zone 66 is provided as another display zone on the regeneration side. The non-eco-drive zone 66 is used to display not only regeneration braking but also braking using the mechanical brake.

Figure 10B:
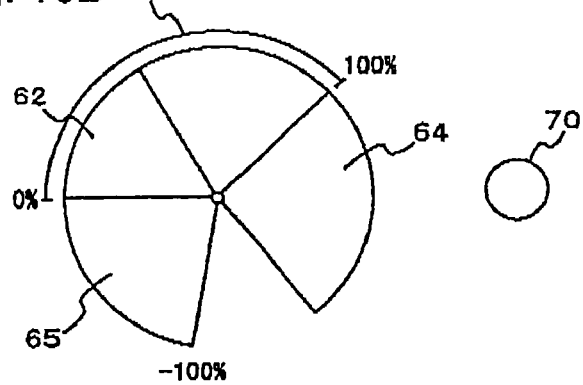

As illustrated in FIG. 10A, an eco-drive lump 70 may be used in addition to the eco-drive bar indicator 60. The eco-drive lump 70 may be formed by an LED and may be turned ON/OFF based on whether the vehicle is in the eco-drive state. The eco-drive bar indicator 60 may be varied as shown in FIG. 10B in which an indicator has a circular shape like a speed meter in which the circular shape has zones corresponding to the respective drive zones. The eco-drive lump 70 may be used in addition to the circular indicator.

The above-described embodiment is configured to provide the eco-drive judgment part 22 in the in-vehicle controller (more particularly, hybrid ECU, and displays the quantity of eco-drive in real time on the basis of the vehicle speed or the like. The embodiment may be varied so that the vehicle speed and the quantity of eco-drive are recorded in a recording medium, and a variation in the quantity of eco-drive with time may be displayed by loading the recorded information to a computer after the driver gets off the vehicle.

The present invention is not limited to the specifically disclosed embodiments, but other embodiments and variations may be made without departing from the scope of the present invention.

The present application is based on Japanese Patent Application No. 2008-197083 filed Jul. 30, 2008, the entire disclosure of which is hereby incorporated by reference.

What is claimed is:

1. An eco-drive assist apparatus that displays a quantity of eco-drive that indicates a degree of ecology or economy in driving in a hybrid vehicle equipped with an engine and a motor, comprising:
   a first part configured to calculate the quantity of eco-drive on the basis of a vehicle power generated in the vehicle; and
   a second part configured to display an eco-drive judgment threshold value that indicates whether the vehicle is in an eco-drive state and an engine startup threshold value that indicates whether the engine has been started up, configured to cause the quantity of eco-drive to be displayed in a graphic manner as a relative quantity to the eco-drive judgment threshold and the engine startup threshold value, and configured to cause the quantity of eco-drive to be displayed on a boundary of the engine startup threshold value or displayed at a position where the quantity of eco-drive is worse than the engine startup threshold value when the engine has been started up,
   the second part causing the engine startup threshold value not to be displayed when the engine has been started up and a driver's operation needs no vehicle power.

2. The eco-drive assist apparatus according to claim 1, wherein the second part causes the quantity of eco-drive to be displayed at a position where the quantity of eco-drive is better than the engine startup threshold value when the engine ahs been started up and a driver's operation does not need vehicle power at all.

3. The eco-drive assist apparatus according to claim 1, wherein the second part causes the quantity of eco-drive to be displayed at a position where the quantity of eco-drive is better than the engine startup threshold value when the engine has been started up and a driver's operation on an accelerator pedal is idle.

4. The eco-drive assist apparatus according to claim 1, wherein the second part causes the quantity of eco-drive to be displayed so that the degree of eco-drive is maximized in a state in which the quantity of eco-drive does not generate energy when a driver's operation needs no vehicle power.

5. An eco-drive assist apparatus that displays a quantity of eco-drive that indicates a degree of eco-drive in driving in a hybrid vehicle equipped with an engine and a motor, comprising:
   a first part configured to calculate the quantity of eco-drive on the basis of a vehicle power generated in the vehicle; and
   a second part configured to display an engine startup threshold value that indicates whether the engine has been started up, configured to cause the quantity of eco-drive to be displayed in a graphic manner as a relative quantity to the engine startup threshold value, and configured to cause the quantity of eco-drive to be displayed on a boundary of the engine startup threshold value or displayed at a position where the quantity of eco-drive is worse than the engine startup threshold value when the engine has been started up,
   the second part causing the engine startup threshold value not to be displayed when the engine has been started up and a driver's operation needs no vehicle power.

6. An eco-drive assist method for displaying a quantity of eco-drive that indicates a degree of ecology or economy in driving in a hybrid vehicle equipped with an engine and a motor, comprising:
   calculating the quantity of eco-drive on the basis of a vehicle power generated in the vehicle;
   displaying an eco-drive judgment threshold value that indicates whether the vehicle is in an eco-drive state and an engine startup threshold value that indicates whether the engine has been started up;
   causing the quantity of eco-drive to be displayed in a graphic manner as a relative quantity to the eco-drive judgment threshold and the engine startup threshold value;
   causing the quantity of eco-drive to be displayed on a boundary of the engine startup threshold value or displayed at a position where the quantity of eco-drive is worse than the engine startup threshold value when the engine has been started up; and
   causing the engine startup threshold value not to be displayed when the engine has been started up and a driver's operation needs no vehicle power.

* * * * *